United States Patent [19]

Peterson et al.

[11] Patent Number: 4,560,011

[45] Date of Patent: Dec. 24, 1985

[54] CULTIVATOR ROW UNIT WITH RIDGER/BEDDER IMPLEMENT

[75] Inventors: Richard L. Peterson, Le Sueur; James A. Johnson, Cologne; Roger J. Scheurer, Kasota; Richard W. Steinberg, Mankato, all of Minn.

[73] Assignee: Hiniker Company, Mankato, Minn.

[21] Appl. No.: 623,789

[22] Filed: Jun. 22, 1984

Related U.S. Application Data

[62] Division of Ser. No. 383,595, Jun. 1, 1982, Pat. No. 4,461,355.

[51] Int. Cl.$^4$ ................. A01B 39/14; A01B 39/20
[52] U.S. Cl. ................. 172/194; 172/722; 172/744; 172/253
[58] Field of Search .............. 172/155, 156, 624.5, 172/744, 722, 724, 736, 740, 720, 700, 730, 253, 254, 193, 194, 250, 251, 252, 245, 246, 734; 111/6, 7

[56] References Cited

U.S. PATENT DOCUMENTS

| 102,789 | 5/1870 | Eppes | 172/725 |
|---|---|---|---|
| 152,201 | 6/1874 | Warinner | 172/700 |
| 200,755 | 2/1878 | Pirkle | 172/245 X |
| 325,839 | 9/1885 | Hogeboom | |
| 2,644,387 | 7/1953 | Kamplade | 172/624.5 |
| 2,815,704 | 12/1957 | Bloom et al. | 172/307 |
| 2,925,056 | 2/1960 | Wade | 172/194 |
| 3,326,152 | 6/1967 | Frantzen | 111/7 |
| 3,581,685 | 6/1971 | Taylor | 172/700 |
| 4,126,190 | 11/1978 | Wylie | 172/624.5 |
| 4,185,699 | 1/1980 | Lewison . | |

FOREIGN PATENT DOCUMENTS

| 628634 | 2/1962 | Belgium | 172/724 |
|---|---|---|---|
| 396058 | 5/1924 | Fed. Rep. of Germany | 172/730 |
| 675637 | 5/1939 | Fed. Rep. of Germany | 172/722 |

OTHER PUBLICATIONS

Lundell Brochures, "Deep Tiller Sub-Soiler Ridger" and Shred Chisel Plow and Double Moldboard.
Koehn, "Shred-N-Plow Mold Board System".
Shultz, "Deep Tiller—Chisel Plow".
Orthman, "Flex-Gang Cultivator".

*Primary Examiner*—Richard J. Johnson
*Attorney, Agent, or Firm*—Emrich & Dithmar

[57] ABSTRACT

An inter-row crop cultivator for use particularly in severe residue conditions such as in minimum tillage conservation applications is disclosed. A leading gauge wheel providing support and soil surface tracking is immediately trailed by two laterally displaced discs which cut away from the row. Aft of the two cutaway discs and directly to the rear of the gauge wheel is a stabilizing and cutting coulter which prevents side to side sway while cutting and reducing residue ahead of a sweep shank which directly trails the cutting coulter. By severing and dividing the residue, the cutting coulter permits the residue to flow over the sweep and around the shank. The shank is adapted to receive an anhydrous ammonia applicator and knife assembly which may be easily and securely mounted to the shank. A plurality of such inter-row crop cultivators may be mounted on a tool bar. A winged ridger/bedder may be either positioned in a non-use or storage position above the soil on the shank or slid down the shank to a use position in contact with the soil for forming the loosened soil and residue into parallel ridges over the newly formed rows in preparing a seed bed for later planting. Various selectively adjustable controls are provided for setting gauge wheel height, stabilizing and cutting coulter height, cutaway disc separation and height, the downward pressure applied to the working implements, and implement deflection cushion tension permitting implement deflection upon impact with an obstruction.

5 Claims, 2 Drawing Figures

CULTIVATOR ROW UNIT WITH RIDGER/BEDDER IMPLEMENT

This is a division of application Ser. No. 383, 595, filed June 1, 1982, now U.S. Pat. No. 4,461,355.

BACKGROUND OF THE INVENTION

This invention relates generally to agricultural crop row cultivators and is more specifically directed toward an inter-row crop cultivator which facilitates the formation of crop rows while providing for the break-up and deposit of surface residue.

Today farmers are increasingly relying on minimum tillage conservation techniques which involve a reduction in the primary or deep tillage of the soil prior to planting so as to leave a trash residue on the surface of the soil. Minimum tillage conservation practices have two primary advantages: (1) a reduction in soil erosion due to wind and water run-off, and (2) a reduction in the number of tractor passes over the tilled land resulting in an associated reduction in operating costs to the farmer, particularly in the form of fuel expenses. Minimum tillage practices have the additional advantages of reducing the amount of time necessary to accomplish planting, permitting the farmer to plant more acreage and allowing him to take advantage of ideal planting conditions, both of which increase his income while enhancing the efficiency of his operation.

Minimum tillage conservation practices can be applied in virtually any soil condition. For example, in light sandy soil which holds little moisture, the soil is not worked prior to planting as each pass with a tillage tool causes moisture evaporation and covers more of the existing crop residue which is necessary to prevent wind and water run-off. The soil is not worked prior to planting and only a no-till, fluted coulter is used in the planter to work a narrow, generally two inches in width, strip and insert the seed through the old residue.

In soil conditions where crops are planted using a till-plant method, the soils are generally heavier and slower to warm up in the spring than the aforementioned sandy fields which are planted no-till with only the use of a fluted coulter. When planting these fields of heavier soil, the row cleaning discs are lowered to clean off an area generally 12" to 14" in width ahead of the fluted coulter and planting unit. This allows the exposed area to warm up from the rays of sunshine and permits better germination of the seed in the exposed planting area. Sufficient residue is deposited in the inter-row areas to control erosion.

The increased residue, or trash, left on the surface to prevent soil erosion in minimum tillage conservation practices causes difficulties when conventional tillage equipment is utilized. For example, the row cleaning discs used in heavier soils to enhance soil warm up by removing the trash therefrom frequently become entangled in the trash which is then dragged along rendering the row cleaning discs ineffective. In addition, with a substantial drag imposed thereupon, the soil sweeping discs may be easily broken, unless specifically designed for high stress tillage applications.

The present invention is intended to avoid the aforementioned limitations by providing a row cultivator for use in severe residue conditions as encountered in minimum conservation tillage practices.

SUMMARY OF THE INVENTION

The present invention includes a frame to which are mounted a forward gauge wheel, a pair of cutaway discs positioned aft of and laterally displaced therefrom, a stabilizing and cutting coulter positioned directly behind the gauge wheel and aft of the cutaway discs and a shank-mounted sweep located aft of and in line with the cutting coulter. The gauge wheel provides cultivator support and floatation; the cutaway discs direct the broken soil toward the center of the inter-crop space; and the cutting coulter prevents side to side sway while cutting and dividing residue ahead of the trailing sweep shank allowing residue to flow over the sweep and around the shank. The shank is adapted to receive an anhydrous fertilizer applicator and knife assembly which may be easily and securely mounted to the shank. In addition, a winged ridger may be selectively positioned along the shank either in a non-use position to ride above the soil, or in a lowered, use position to engage the soil loosened by the sweep for displacing that soil and residue into ridges over the rows.

A plurality of these row cultivator units may be positioned on a single tool bar while the frame of each unit provides for selectively adjusting the operation of each of the aforementioned implements. The row unit is pulled by two parallel links coupled to the tool bar and includes an adjustable down pressure spring mechanism for varying the weight applied to the row unit. In addition, manual adjustment of gauge wheel height, stabilizing and cutting coulter height, and down pressure spring mechanism tension is provided.

The row cultivator unit of the present invention is particularly adapted for use in severe residue conditions such as found in minimum tillage conservation practices. The cultivator may be used as a row crop cultivator in the precision cultivating of newly emerging crops, as a combination row cultivator and ridger or hiller tool by lowering the ridging attachment down onto the sweep, or as a nitrogen applicator by incorporating a conventional applicator to the trailing shank member.

BRIEF DESCRIPTION OF THE DRAWINGS

The appended claims set forth those novel features believed characteristic of the invention. However, the invention itself, as well as further objects and advantages thereof will best be understood by reference to the following detailed description of a preferred embodiment taken in conjunction with the accompanying drawings, where like numerals identify like elements of the invention in the various views, in which:

DESCRIPTION OF THE PREFERRED EMBODIMENTS

Figure 1:
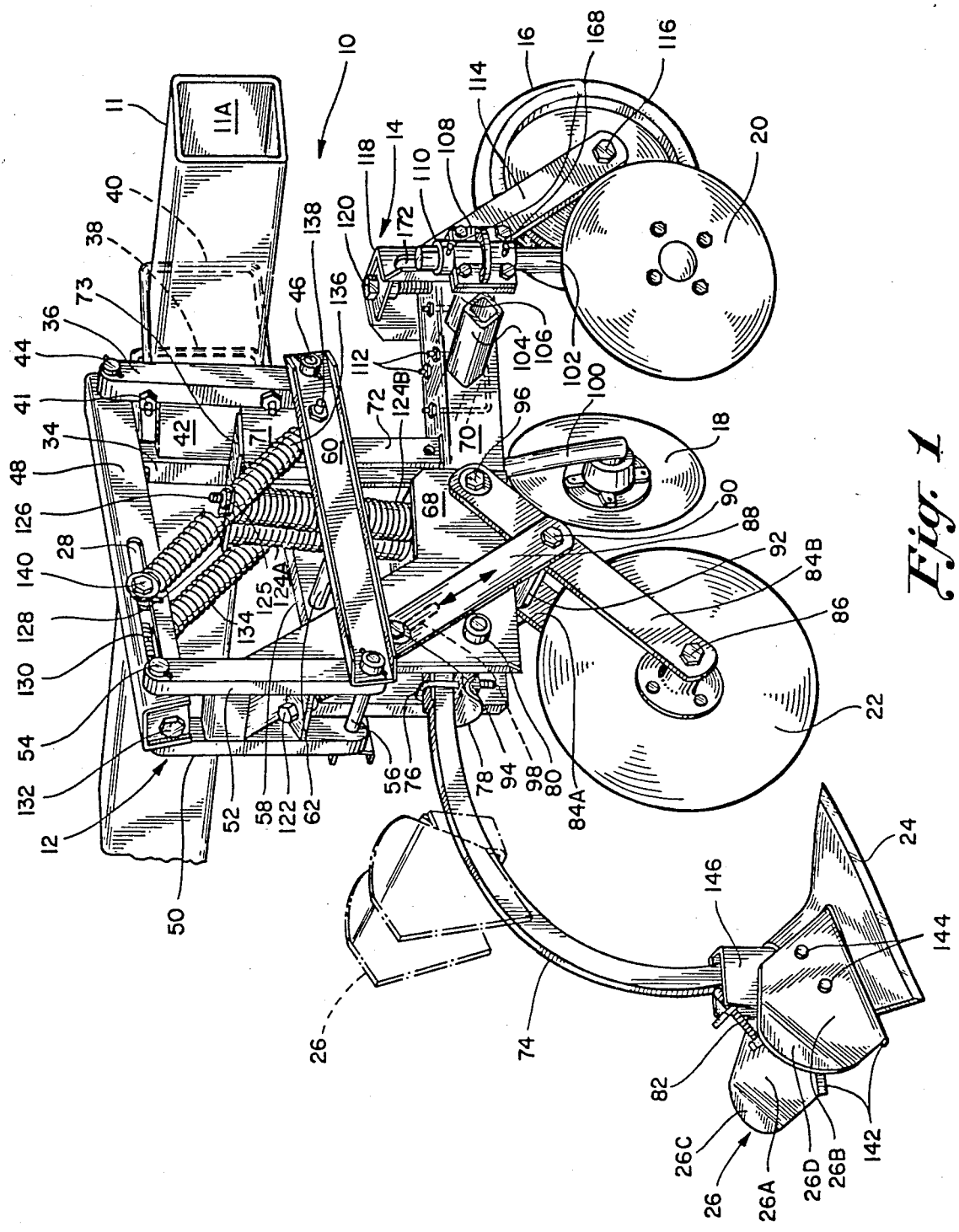
FIG. 1 is an upper perspective view of a cultivator row unit with a ridger/bedder implement attached thereto in accordance with the present invention.
Figure 2:
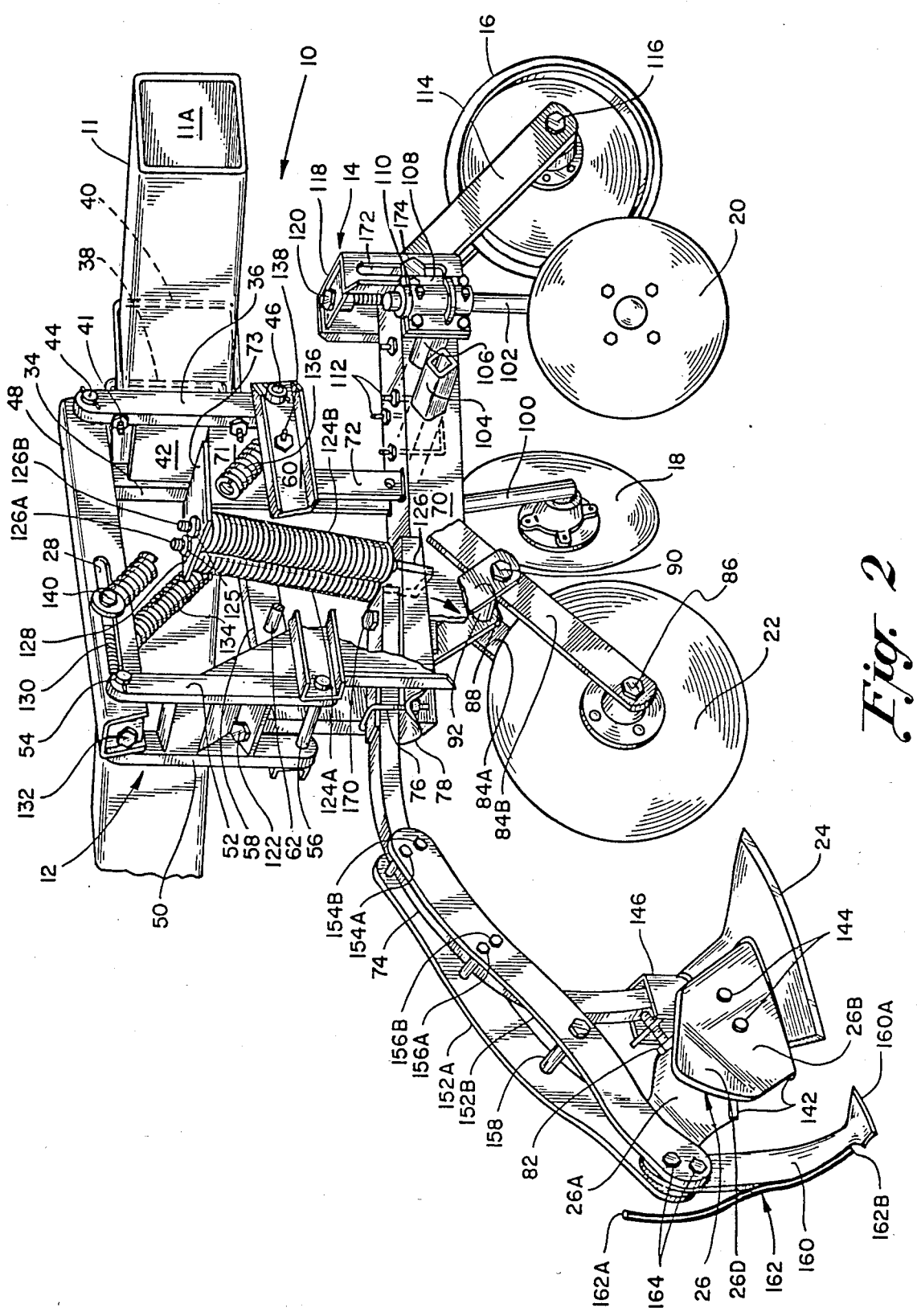
FIG. 2 is a partially broken away upper perspective view of a cultivator row unit with a ridger/bedder implement attached thereto in accordance with the present invention.

Referring to FIGS. 1 and 2, there is shown a cultivator row unit 10 in accordance with the present invention. Cultivator row unit 10 includes an upper frame 12 and a lower frame 14 to which a plurality of soil working implements are mounted. These implements include a leading gauge wheel 16, a pair of row cleaning, or cutting away, discs 18, 20, a stabilizing and cutting coulter 22, and a sweep 24.

The upper frame 12 is in the form of a flexible parallelogram comprised of right and left front masts 34, 36, upper member 48, right and left rear masts 50, 52, and right and left lower members 58, 60. Right and left front masts 34, 36 are flexibly coupled to upper member 48 by means of a connecting pin 44, which typically could be a nut and bolt combination. The lower portion of right and left front masts 34, 36 are respectively coupled to right and left lower members 58, 60 by means of connecting pin 46. Similarly, right and left lower members 58, 60 are respectively coupled to the lower portions of right and left rear masts 50, 52 by means of connecting pin 56 while upper member 48 is coupled to an upper portion of right and left rear masts 50, 52 by means of connecting pin 54. The connecting pins joining respective, adjacent upper frame members provide for the rotational displacement therebetween permitting the shape of the parallelogram generally defined by the aforementioned upper frame members to be selectively varied.

The upper frame 12 is rigidly mounted to a conventional tool bar 11 by means of U-shaped bolts 38, 40 inserted through right and left front masts 34, 36 and rigidly secured thereto by means of nuts 41. Tool bar 11 includes a hollow portion 11A running the length thereof which may be filled with concrete block for applying an additional downward force to the cultivator row unit when desired. Spacers 42, 62 are respectively inserted between right and left front masts 34, 36 and right and left lower members 58, 60 of upper frame 12 for providing increased strength and rigidity thereto. Positioned in the lateral surfaces of upper member 48 are slots 28 through which is inserted a connecting pin 140. Connecting pin 140 is coupled to the upper end portions of right and left load control springs 134, 136. The lower end portions of right and left load control springs are coupled to a connecting pin 138 inserted through and positioned in right and left lower members 58, 60 of upper frame 12.

Connecting pin 140 is also coupled in a conventional manner to threaded load control bolt 130 which is inserted in an aperture in the rear surface of upper member 48. The bolt head 132 of load control bolt 130 is positioned outside of upper member 48 and permits load control bolt 130 to be selectively rotated. Upper mounting bolt 140 is threadably coupled to load control bolt 130 such that the rotation of load control bolt 130 effects the linear displacement of upper mounting bolt 140 along the aperture 28 in upper member 48. Thus, the clockwise rotation of bolt head 132 causes upper mounting bolt 140 to be displaced forward in upper member 48 while the counterclockwise rotation of bolt head 132 causes upper mounting bolt 140 to be displaced rearward. This results respectively in a decrease or increase in the tension applied by right and left load control springs 134, 136 between upper member 48 and respective right and left lower members 58, 60. With right and left front masts 34, 36 rigidly coupled to tool bar 11 and with the lower portion of right and left load control springs 134, 136 coupled closer to the front masts 34, 36 than the upper portion of these springs, the downward pressure applied to the rear portion of upper frame 12 may be selectively controlled by varying the position of upper mounting bolt 140 in slot 28 by means of the rotation of load control bolt 130. In addition, right and left load control springs 134, 136 provide a cushion effect for the gauge wheel 16, the right and left row cleaning discs, or cutting away coulters 18, 20, and the cutting coulter 22.

The lower frame 14 includes a yoke 68 and a channel 70 which are rigidly coupled in a conventional manner such as by welding and/or bolting. Rigidly affixed to an upper surface of channel 70 is alignment bar 72 which is positioned within sleeve 71. Sleeve 71 is rigidly coupled to right and left front masts 34, 36. The insertion of alignment bar 72 within sleeve 71 insures the alignment between upper and lower frames 12, 14 in the event lower frame 14 is displaced upward such as in the event of impact between a working implement mounted thereto and an obstruction in the soil being worked. The cooperation between sleeve 71 and alignment bar 72 not only provides for the alignment between upper and lower frames 12, 14, but also increases the lateral strength and rigidity of the cultivator row unit. Secured to the upper end of alignment bar 72 is displacement stop 73 which limits the downward displacement of the lower frame 14 with respect to the upper frame 12.

The upper portion of yoke 68 is rigidly coupled to right and left rear masts 50, 52 in a conventional manner such as by welding or bolting. By selectively setting the tension on right and left load control springs 134, 136, the downward force of the weight of tool bar 11 on lower frame 14 and hence on the working implements coupled thereto may be selectively varied. Thus, by increasing the tension as by displacing upper mounting bolt 140 rearward, the weight of tool bar 11 may be increasingly transferred to the working implements of the cultivator row unit. Similarly, by displacing upper mounting bolt 140 in a forward direction, the tension in the load control springs is reduced resulting in a decrease in the tool bar load applied to the working implements.

Cutting coulter 22 is mounted to the yoke portion 68 of the lower frame 14 by means of upper support arms 88 and lower support arms 84A, 84B. The upper support arms 88, of which only the left arm is shown in FIG. 1, are pivotally mounted to the lower frame by means of connecting pin 94 while lower support arms 84A, 84B are pivotally mounted to the lower frame by means of connecting pin 96. The upper and lower support arms are mutually coupled in a pivoting manner by means of connecting pin 90 with a spacer 92 inserted therearound and positioned between adjacent lower support arms for increased structural strength. Finally, cutting coulter 22 is rotationally mounted to the lower portions of support arms 84A, 84B by means of mounting bolt 86.

Yoke 68 includes slots 98 incorporated on each side thereof and in which is inserted connecting bolt 94, as shown in FIG. 1. Connecting bolt 94 may be linearly displaced along and within slot 98 in the lateral surface of yoke 68 permitting upper support arms 88 to also be linearly displaced thereby. This is accomplished by means of cutting coulter height adjusting bolt 122 which is rotationally mounted and coupled to the right and left rear masts 50, 52 of upper frame 12. Adjusting bolt 122 is coupled in a conventional manner to connecting bolt 94 with connecting bolt 94 linearly displaced within slot 98 in response to the rotation of adjusting bolt 122. With upper support arms linearly displaceable in the direction of the arrow shown in the Figure, the height of stabilizing and cutting coulter 22 with respect to the cultivator frame may be precisely adjusted. The manual adjustment of cutting coulter adjusting bolt 122 thus permits the running depth of cutting coulter 22 to be selectively adjusted.

Mounted on an upper portion of lower frame 14 in a generally vertical orientation are cushion springs 124A, 124B. These cushion springs are mounted thereto by means of a spring guide U-bolt 126 rigidly coupled to a lower portion of shank mount 78, as shown in FIG. 2, and inserted within and along the length of each cushion spring. Positioned adjacent the upper end of each spring guide rod 126 are a casting 128 and a positioning nut 125. The position of casting 128 along spring guide rod 126 is controlled by means of positioning nut 125 which is mounted on a threaded portion of the upper end of the spring guide rod 126. By rotating positioning nut 125 the downward pressure applied to the lower frame by means of the cushion springs 124 may be selectively adjusted. Thus, the spring cushion tension of the sweep 24 mounted to the shank 74 permitting it to be deflected upon impact with an obstruction in the soil may be precisely controlled by means of a simple manual adjustment.

The channel portion 70 of the lower frame 14 includes lateral surfaces in which are slidably positioned right and left disc upper support elements 104, 106. Coupled to the outer end of the right and left disc upper support elements 104, 106 are support clamps 108 (only one of which is shown in the Figure). Slidably coupled to the right support clamp (not shown) and the left support clamp 108 are right and left disc lower supports 100, 102. Rotationally mounted to the lower end portion of right and left disc lower supports 100, 102 are right and left row cleaning discs 18, 20, respectively.

Although slidably inserted in adjacent holes in the lateral surfaces of the channel portion 70 of lower frame 14, the right and left disc upper support elements 104, 106 may be rigidly mounted therein by means of diagonal U-bolts 112 which are diagonally mounted in the lower frame with respect to the longitudinal axes of the respective disc upper support elements. By tightening diagonal U-bolts 112 in lower frame 14, the disc upper support elements 104, 106 may be rigidly positioned within the lower frame so as to laterally position the row cleaning discs 18, 20 as desired with respect to the cultivator row unit 10.

A right locking collar (not shown) and a left locking collar 110 are respectively coupled to the upper end portions of right and left disc lower supports 100, 102. This permits the lower supports to be linearly displaced in a generally vertical direction within the respective support clamps allowing the height of the respective coupled row cleaning discs to be selectively adjusted. The locking collars 110 are conventional in design and include set screws 168 threadably positioned therein for engaging the upper end portion of a disc upper support element. Cleaning disc angle setting is established by rotating a respective disc lower support within a respective support clamp 108 to provide the desired cleaning disc angle with respect to the direction of movement of the cultivator, and tightening the support clamp 108 by means of the four bolts positioned therein.

As shown in the Figures, the angular orientation of right and left row cleaning discs 18, 20 will result in the formation of a ridge or upraised area of soil between the row cleaning discs. The action of the row cleaning disc displaces trash on the surface of the soil to the thus formed ridge of soil over which cutting coulter 22 passes. The trash is thus reduced and separated by means of the cutting coulter for shortening the period required for its decomposition. The thus formed ridge is located between adjacent crop rows and enhances water distribution thereto while reducing soil erosion.

Positioned on the front end portion of channel 70 of frame 14 is a mounting bracket 118 which is slidably positioned in the vertical direction. The coupling between the front end portion of channel 70 and mounting bracket 118 may be conventional in nature such as by a front mounting bolt 174 inserted in holes (not shown) in the lateral surfaces of channel 70 and through generally vertically oriented slots 172 in each lateral surface of mounting bracket 118. In this manner, mounting bracket 118 may be vertically positioned along the front portion of channel 70. Positioning bolt 120 is incorporated in an upper surface of mounting bracket 118 for this purpose. By rotating positioning bolt 120, the vertical position of mounting bracket 118 relative to channel 70 may be selectively adjusted.

Rigidly coupled to a front surface of mounting bracket 118 is the upper end portion of mounting arm 114. The lower end portion of mounting arm 114 is rotationally coupled to gauge wheel 16 by means of mounting bolt 116. The heighth of gauge wheel 16, or the vertical displacement between it and the cultivator row unit 10, may be selectively adjusted by rotating positioning bolt 120 as desired. In this manner, the floatation or ground tracking characteristics of the cultivator row unit of the present invention may be selectively adjusted.

Coupled to the rear, lower portion of yoke 68 by means of shank mount 78 with U-bolt 76 and front mounting bolt 170 is shank 74. Shank mount 78 is coupled to the lateral surfaces of yoke 68 by means of bolt mount 80 in a conventional manner. In addition, as shown in FIG. 2, the combination of the lower portion of U-bolt 126 and the upward pull of cushion springs 124A, 124B, U-Bolt 76 and front mounting bolt 170 positioned through apertures in shank mount 78 securely engage shank 74. Shank mount 78 is free to pivot about bolt mount 80 to allow for the free, although biased, displacement of the shank 74 upon the impact of sweep 24 with an obstruction, such as a rock (not shown) in the ground. Sweep 24 is biased downward in a ground-engaging position by means of cushion springs 124A, 124B which permit its upward displacement when subjected to the aforementioned deflection impact force. To the lower, distal end of shank 74 is mounted a sweep implement 24. The sweep 24 trails immediately aft of the cutting coulter 22, under cutting weed roots between adjacent crop rows, and exposing the thus cut weeds in effectively controlling their growth. Sweep 24 is rigidly mounted to the lower end portion of shank 74 in a conventional manner such as by bolts (not shown).

Positioned on shank 74 is a ridger bedder 26 which includes a rectangular collar 146 and right and left lateral portions 26A, 26B. Right and left lateral portions 26A, 26B are rigidly coupled to each other and to rectangular collar 146 by means of a plurality of mounting bolts 144. The lower edges of right and left lateral portions 26A, 26B include lip portions 142 which form two sides of an equilateral triangle. The thus formed equilateral triangle is oriented such that a point defined by the intersection of right and left lateral portions 26A, 26B is positioned so as to face the direction of travel of the row cultivator. The base of the triangle is positioned in a trailing relation with respect to the direction of travel. The plane of the triangle partially defined by lip portions 142 travels parallel to and above the shear line of the soil being tilled by sweep 24. Thus, lip portions 142 and right and left lateral portions 26A, 26B form the leading edges of the equilateral triangle. Rectangular collar 146 is positioned in sliding relation on shank 74. Collar 146 includes a set screw 82 which is used for locking the ridger bedder 26 in either a field working mode, as shown by the lower position of the ridger bedder, or in a nonworking mode, shown in FIG. 1 in dotted line form where the ridger bedder is securely positioned to an upper portion of the shank 74.

The sweep 24 engages and loosens the soil located between adjacent crop rows and deflects the thus loosened soil upward. This soil may include severed and reduced trash as well as the undercut weed roots as previously described. This displaced soil and trash mixture is directed by the sweep 24 against the right and left lateral portions 26A, 26B of the ridger bedder 26 when in the lowered, use position.

Ridger bedder 26 forms the displaced soil in a generally upraised linear configuration, as previously described, in the form of a ridge or linear mound. This action re-builds the ridge for the preparation of a seed bed for later planting. In the use position shown in solid line form in FIG. 1, the winged ridger or bedder device 26 thus forms a well-defined furrow and re-builds existing ridges of the loosened soil and residue for future row crop planting or for irrigation purposes. In the non-use position shown in phantom, the ridger bedder 26 does not engage the soil and the soil worked by the sweep 24 is loosened and mixed with the trash reduced by the cutting coulter 22.

Shown in FIG. 2 is an anhydrous fertilizer applicator and knife assembly securely mounted on shank 74. The fertilizer applicator and knife assembly includes left and right mounting brackets 152B, 152A which are coupled together, with shank 74 positioned therebetween, by means of forward mounting bolts 154A, 154B and rear mounting bolts 156A, 156B. Coupling bolt 158 rigidly connects the center portions of the left and right mounting brackets 152B, 152A together and increases the structural integrity of the fertilizer applicator assembly. An upper portion of an anhydrous fertilizer knife 160 is rigidly mounted to a lower portion of left and right mounting brackets 152B, 152A by means of mounting bolts 164. The lower end portion of the applicator knife 160A is designed and positioned to engage the ground being worked in providing a furrow into which the anhydrous fertilizer is deposited by means of applicator 162. The anhydrous fertilizer applicator 162 includes an upper end portion 162A which is connected to a source of anhydrous fertilizer and a lower end portion 162B through which the fertilizer is deposited. The anhydrous fertilizer applicator 162 is rigidly mounted to the rear portion of the applicator knife 160 in a conventinal manner.

There has thus been described a cultivator row unit with a selectively engagable ridger/bedder implement for inter-row tillage particularly adapted for operation in severe residue conditions such as found in minimum tillage conservation practices. A plurality of working implements may be mounted to the cultivator row unit for selectively engaging the worked soil with various manual adjustments available for controlling cultivator row unit operation.

While particular embodiments of the present invention have been shown and described, it will be apparent to those skilled in the art that changes and modifications may be made therein without departing from the invention in its broader aspects. The aim of the appended claims, therefore, is to cover all such changes and modifications as fall within the true spirit and scope of the invention.

We claim:

1. In an inter-row crop cultivator for use in conservation tillage applications and having a frame adapted to be pulled by a traction vehicle, the combination comprising:
    a plurality of sweeps carried by said frame, each sweep located between adjacent crop rows and including a shank for mounting said sweep to said frame;
    a ridger/bedder attachment for each sweep and movable along the shank thereof between a raised non-use position and a lowered use position, said ridger/bedder attachment having a pair of wings extending from the center thereof in an upward, laterally outward and rearward direction such that when said attachment is in said use position it is located immediately behind its associated sweep and cooperate with said sweep to raise and laterally deflect soil and trash worked by said sweep, and when said attachment is raised to the non-use position, it is out of substantial contact with soil worked by said sweep; and
    means carried by each attachment for selectively securing said attachment to the shank of its associated sweep either in said use or said non-use position.

2. The combination of claim 1 wherein said ridger/bedder attachment is positioned immediately above its associated sweep when in the use position.

3. The combination of claim 1 wherein said wings of ridger/bedder attachment form two sides of an equilateral triangle and are inclined inwardly toward one another in the direction of travel of said frame when pulled by a traction vehicle.

4. The combination of claim 1 wherein the lower edge portions of said wings are aligned generally parallel to and slightly above its associated sweep when in the use position, and wherein the configuration of said wings is tapered upward with the base of said ridger/bedder attachment larger than the upper portion thereof.

5. The combination of claim 1 wherein said means for selectively securing said attachment to a shank comprises the combination of a mounting collar positioned around said shank and a set screw inserted through said mounting collar for engaging said shank for selectively positioning said ridger/bedder attachment along said shank.

* * * * *